May 6, 1969          S. L. BATOG          3,442,070
REEL CONTROL MECHANISM
Filed Jan. 3, 1966          Sheet 1 of 2
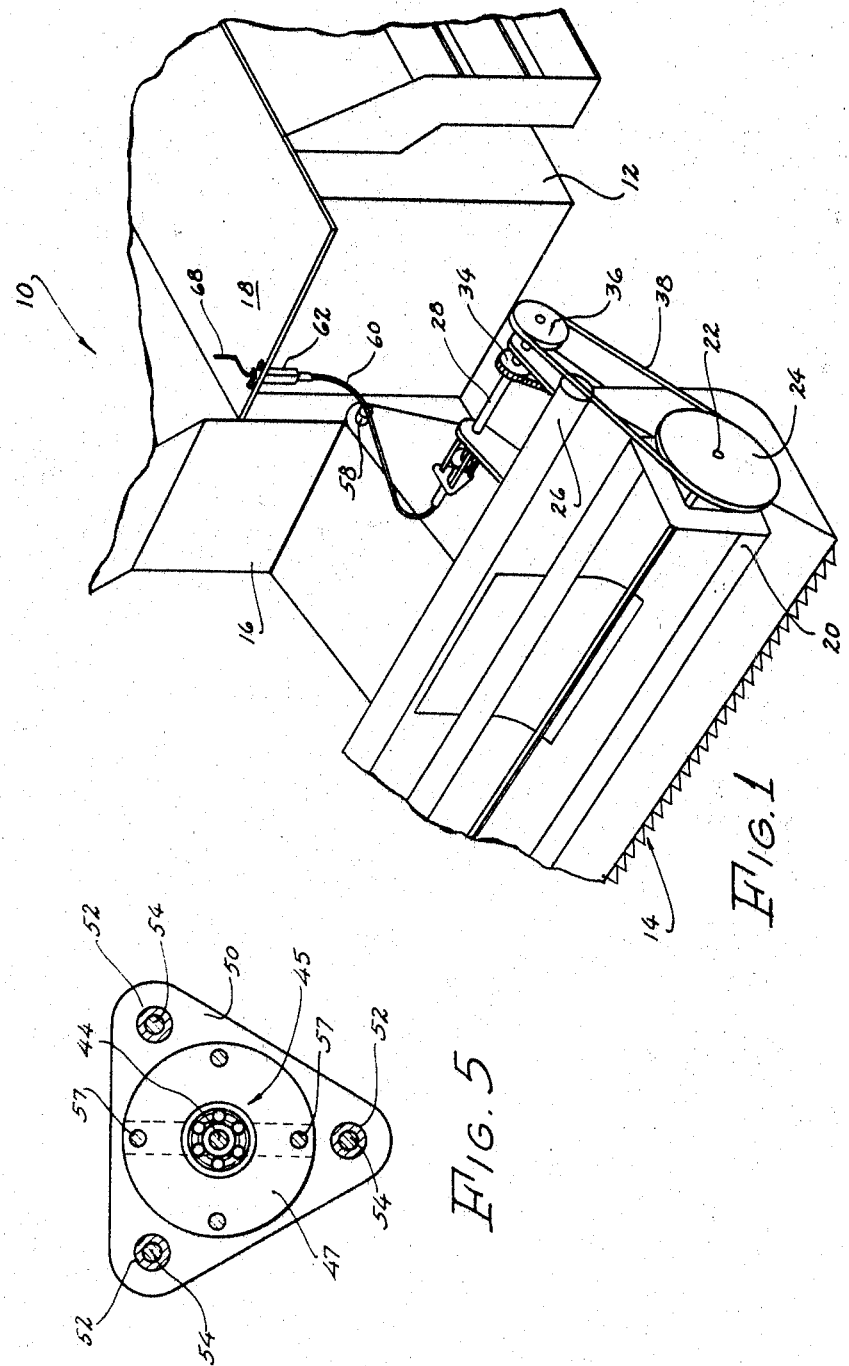
INVENTOR
STEPHEN L. BATOG.
BY
      ATTY
      AGT

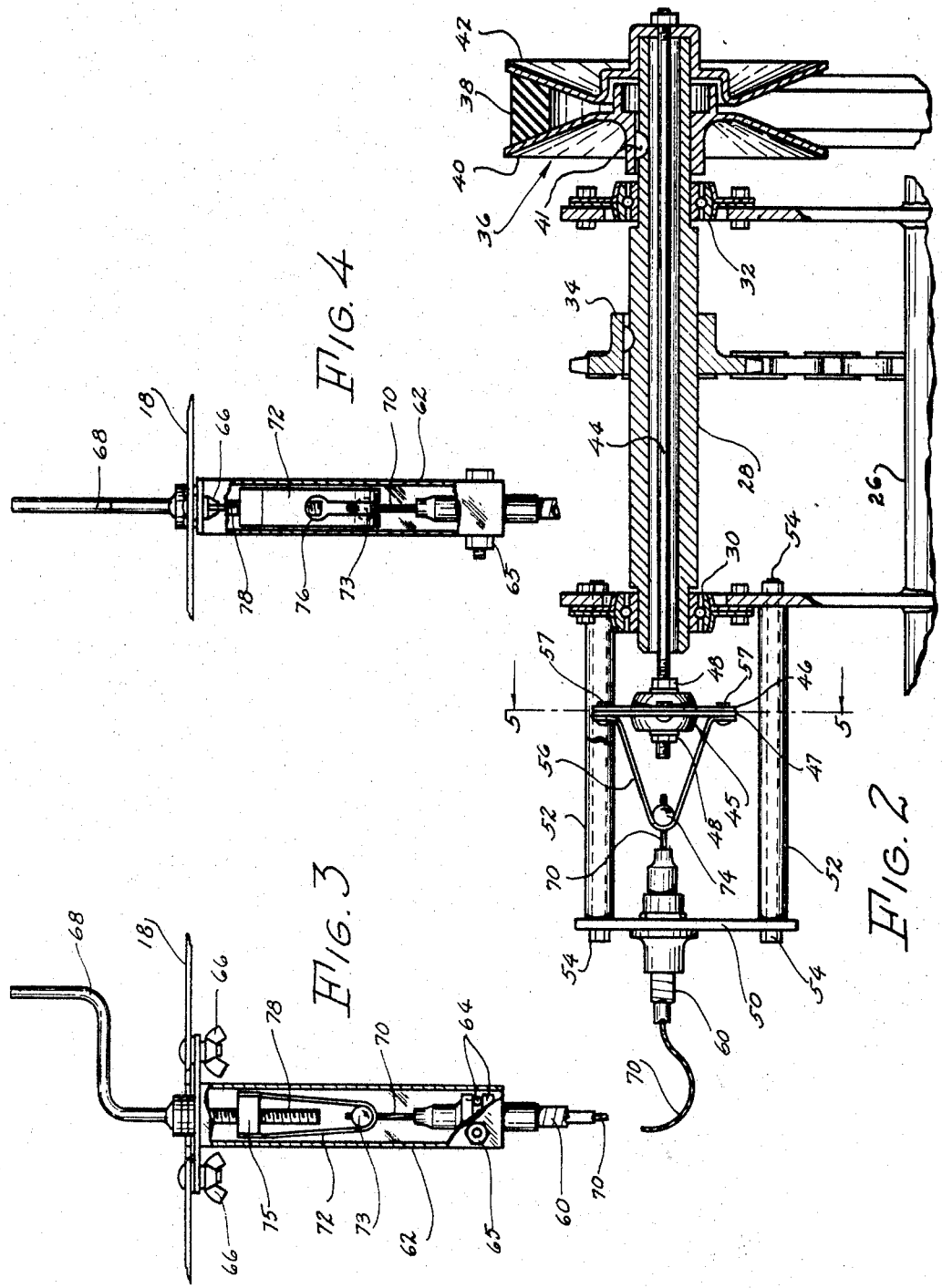

United States Patent Office 3,442,070
Patented May 6, 1969

3,442,070
REEL CONTROL MECHANISM
Stephen L. Batog, Moline, Ill., assignor to J. I. Case Company, Racine, Wis., a corporation of Wisconsin
Filed Jan. 3, 1966, Ser. No. 518,350
Int. Cl. A01d *41/04, 41/12*
U.S. Cl. 56—21  3 Claims

ABSTRACT OF THE DISCLOSURE

A harvester having a frame and an operator's station and a header pivotally attached to the harvester and including a rotatable reel. Variable speed drive means are connected between the drive of the harvester and the header reel for varying the rotational speed of the reel. A drive control means extends from the operator's station to the variable speed drive means for controlling the adjustment of the drive means and thereby controlling the speed of rotation of the reel.

---

The present invention relates to harvester threshers and particularly to a variable speed drive control for a combine header.

Variable speed drives are used on many agricultural and industrial machines, one of the common applications being to vary the speed of the traction drive on a combine. Many of the drives employ sheave-type pulleys and belts, the pulleys having a fixed sheave half and a movable sheave half so if it is desired to increase the speed or r.p.m. of a driven device the movable half is closed on the fixed half and the belt rides higher in the variable groove. Conversely, if it is desired to decrease the speed of a driven device, the movable half is opened from the fixed half and the belt rides lower in the groove.

Another drive on a combine is for the reel assembly and, in recent years, it has become standard practice in design to provide a drive which will vary the speed of the reel. The reel is usually a part of the header assembly which assembly is supported on the front of the combine and constructed to be moved up and down according to the height at which the operator wishes to cut the crop material. In a conventional machine, the header assembly pivots on supporting pins and many machines are built so that the header assembly can be removed at a point ahead of the threshing mechanism. Various attachments are available for a combine, such as a corn head which replaces the regular harvesting header assembly, and therefore the header and the attachments should be quickly and easily interchanged.

Since many of the modern machines include controls remote from the device being adjusted or controlled, the logical place to install the remote handles or buttons is on or near the operator's platform. The operator can thus make the necessary adjustment due to varying crop conditions without stopping the machine and manually making the adjustment which results in a loss of good harvest time.

When changing the header assembly from a cutter bar, reel, and auger type to a corn head type, it is desirable to perform this in a minimal amount of time and it follows that all controls must also be quickly detached or attached. One of the controls which must be detached when removing the regular header assembly is the control for the variable speed reel drive.

The main object of this invention is to provide a control means for actuating a remotely controlled reel drive.

Another object is to provide a quick disconnect control means for a reel drive.

A further object is to provide a quick disconnect control means which is flexibly constructed so it can be moved with the header assembly.

Additional objects and advantages will become apparent from a reading of the specification and the annexed drawings, in which:

FIGURE 1 is a perspective view of a part of a combine, showing the invention;

FIG. 2 is an enlarged diagrammatic view partly in section, of the invention;

FIG. 3 is an elevational view, partly in section, of the operator's control;

FIG. 4 is a side view of the control shown in FIG. 3; and

FIG. 5 is a view taken on the line 5—5 of FIG. 2.

As seen in FIG. 1, the invention is shown mounted on a harvester 10, the harvester having a frame 12, carried on wheels (not shown), a header assembly 14, a threshing body 16, and an operator's platform 18. These parts of a combine are well known and need not be further described except as they relate to the present invention. The invention includes a quick disconnect control mechanism for the harvester reel—the purpose and ultimate goal being to control the reel speed from the operator's platform and to provide a mechanism which can be easily and quickly detached when removing the header assembly 14 from the combine body 16. As is commonly known, the header assembly also includes an auger for conveying the crop material to the feed rake which rake carries the material to the threshing mechanism. In FIG. 1, the auger (not shown) would be positioned rearward of the reel and in the header trough.

In present-day machines, the reel drive is designed and constructed so that the speed of the reel can be varied, say from 15 to 45 r.p.m. The variable speed drive for the reel and the up-and-down and fore-and-aft reel adjustments have had success in prior machines and these features are conventional in many present day combines. The variable speed for the reel drive is accomplished with a sheave-type pulley and many machines include a manual adjustment of the movable sheave half whereas some present day machines include a means for adjusting the reel drive from a remote location. The present invention provides a novel remotely operated control mechanism for adjusting the reel speed and the other parts of the machine will be described insofar as they relate to the invention. The header assembly includes a reel 20 on a shaft 22, the shaft being rotatably supported in a suitable manner at the sides of the header. Fixed on shaft 22 is a driven pulley 24 which is of conventional type and adapted to carry a driving belt.

A header torque tube 26 is positioned rearward of the header assembly and connected by suitable means to the body of the combine and to the header assembly for supporting the header in a well-known manner.

The header torque tube supports a hollow shaft or support member 28 suitably supported in bearings 30 and 32 for rotation therein, the bearings having conventional ball elements. A driver sprocket 34 is fixed on shaft 28 for driving the shaft from suitable drive means on the combine. A variable pitch sheave 36 is on shaft 28 and carries a drive means or belt 38 for driving the reel pulley 24. Sheave 36 has a fixed half 40 and a movable half 42 adjacent the fixed half on shaft 28. Fixed sheave 40 is secured to shaft 28 near the outer end thereof by means of a key 41 in a slot in the shaft. Movable sheave 42 is placed adjacent sheave 40, however, it is not fixed to the shaft as it must move axially along the shaft to provide for a variation in the location of the drive belt 38 radially from the center of the shaft.

It is thus seen that the drive means for the reel includes the drive sprocket 34 fixed on and driving the rotating shaft 28, the shaft having a variable sheave 36 carrying a belt 38 and driving the reel pulley 24. The reel drive means is considered to be a part of the conventional machine and will not be further described except as it relates to the invention.

Connected at one end to sheave half 42 and rotatable in shaft 28 is a control means or tension rod 44, as seen in FIG. 2. The other end of rod 44 is positioned to be rotatably supported in a bearing 45 having bearing flanges 46 and 47 and adjustably secured by nuts 48. A mounting plate 50 is supported from the fixed portion of bearing 30 by means of pipe spacers 52 and bolts 54 there being three bolts encased in equally spaced pipe spacers. Fixed to bearing flanges 46 and 47 is a clevis 56, the purpose and operation of which will be later described.

It will be understood that control rod or shaft 44 is connected to movable sheave 42, and rotates with that sheave, it is supported throughout substantially its entire length in shaft 28 and is journaled at one end in bearing 45. Suitable means are used to secure clevis 56 to flanges 46 and 47, such as bolts 57.

The header assembly which carries the reel must necessarily be supported from the combine body in a pivotal manner to accommodate the raising and lowering of the header according to the desired cutting height. The header is pivotally supported on a member 58, shown in FIG. 1, so it must be understood that any control means operated from the combine platform and controlling any part of the header requires some flexibility or "give" to be compatible with the header movement. The present invention includes an enclosure or tubular element 60 supported on the header and the combine and extending from the mounting plate 50 to the operator's platform. An elongate housing 62 of rectangular shape is attached to the underside of the platform, as seen in FIGS. 3 and 4, and tube 60 extends into and is connected to the housing by means of anchors 64 secured by bolts 65. The housing 62 is constructed to be quickly attached and detached from the platform by means of bolts and wing nuts 66. An adjusting means or crank 68 is journaled in the housing at the top thereof and the housing and crank are located on the platform so as to be conveniently within reach of the operator. An extended flexible member or cable 70 is contained in enclosure 60 and one end of the cable is connected to a threaded clevis-like member 72 within housing 62, as seen in FIG. 3. A holding element or ball 73 is fixed to the one end of cable 70 in housing 62 and is seated in the U of the member 72. Threaded member 72 is disposed within housing 62 and the threaded portion 75 of member 72 is constructed so as to substantially fit in and slide within the housing 62. Member 72 also has an opening 76, seen in FIG. 4, for insertion of ball 73. The other end of cable 70 extends through plate 50 and clevis 56 and has a holding element or ball 74 fixed on the end thereof, the ball seating in the U of the clevis 56, as seen in FIG. 2.

It is thus seen that control rod 44 is connected to and rotates with the outer or the movable sheave 42, and as rod 44 is moved axially within shaft 28, the sheave 42 moves either closer to or farther from the fixed sheave depending upon whether the operator desires to increase or decrease the reel speed. Control rod 44 is a tension rod by virtue of the belt 38 continuously exerting a force on the fixed and movable sheaves. The belt is normally kept taut under driving conditions and tends to move toward the axial center line of shaft 28 which also tends to move the outer or movable sheave away from the fixed sheave. Cable 70 is also constructed and adjusted to be in tension and is maintained relatively taut in enclosure 60 so that balls 73 and 74 are kept seated in their respective clevises. Adjusting nuts 48 on either side of bearing flanges 46 and 47 enclosing bearing 45 are set to maintain the proper tension for rod 44 and cable 70.

When the operator turns the control handle 68, a portion 78 moves in threaded portion 75 in housing 62 and cable 70 moves in enclosure 60. Assuming the operator turns the handle in a clockwise direction, as viewed from a position above the platform, member 72 will slide up in housing 62 and pull on cable 70 and rod 44 and draw sheave 42 nearer sheave 40, the belt 38 will be forced outwardly in the V and the reel speed will be increased. As stated above, rod 44 and cable 70 are in tension so that when the handle is turned in a counterclockwise direction, the tension of belt 38 will force sheave 42 away from sheave 40, the belt will ride lower in the V and the reel speed will be decreased. Since cable 70 is fixed to ball 74 seated in clevis 56, movement of cable 70 will cause rod 44 and movable sheave 42 to be disposed axially along shaft 28.

As stated above, the header assembly can be quickly removed from the combine body and therefore all controls for the header must be quickly disconnectable from the body. This is especially true in the case where the operator wishes to remove the harvester header and install a row crop attachment.

The above description and the drawings disclose a remotely located control mechanism for a combine reel which is compatible with the movement of the header assembly and which is quickly disconnectable from the attaching means.

The construction of the control mechanism provides unrestricted movement with the header position, it is quickly and easily removed when required, and it maintains the proper tension on control rod 44 and cable 70 to vary the speed of the reel drive. It is to be understood that variations in the construction and details will doubtless occur to those skilled in the art and it is intended that these variations be considered as within the scope of this application. A drive chain may be used in place of belt 38, a slotted member for bearing 45 and plate 50 may be positioned to support these parts from the torque tube 26, and the housing 62 and handle 68 may be altered slightly to provide for a more economical and efficient control. The above description and the invention is not to be taken as limited in any manner except as defined in the following claims.

What is claimed as new and desired to be secured by Letters Patent of the United States is:

1. In a harvester having a frame and an operator's station and a header drive means, a header detachably and pivotally mounted on said frame and including a rotatable reel and a driven shaft drivingly connected with said header drive means, a variable speed pulley and belt combination drivingly connected between said driven shaft and said reel for rotating the latter at selected speeds and including an adjustable pulley half mounted on said driven shaft and being axially movable on said driven shaft, the improvement comprising said driven shaft being hollow, said adjustable pulley half being mounted on one end of said driven shaft, a tension rod extending through said hollow drive shaft and being axially movable therein and being connected at one end to said adjustable pulley half for setting the axial position of said adjustable pulley half, a structurally flexible cable anchored at one end to said harvester at a location adjacent said operator's station and anchored at the other end on said header adjacent the other end of said driven shaft and with said cable other end being operatively connected to the other end of said tension rod, said flexible cable being adjustable along its length for axially moving said tension rod and being flexible to accommodate the pivotal movement of said header on said harvester.

2. The subject matter of claim 1, including a rotation bearing rotatably supporting said tension rod at said other end of said tension rod for rotation of the latter along with the rotation of said pulley.

3. The subject matter of claim 2, wherein said bearing includes a non-rotating portion, and said cable other end being operatively connected to said bearing non-rotating portion for the said operative connection of said cable other end to said tension rod for axially moving the latter.

References Cited

UNITED STATES PATENTS

| | | | |
|---|---|---|---|
| 2,189,295 | 2/1940 | Pfleger | 74—230.17 |
| 2,297,936 | 10/1942 | Ballman | 74—230.17 |
| 2,639,569 | 5/1953 | Pasturczak | 56—20 |
| 2,791,909 | 5/1957 | Rick | 74—89.15 |
| 3,269,201 | 8/1966 | Looker | 74—230.17 |
| 3,283,485 | 11/1966 | Koch et al. | 56—23 |
| 3,324,637 | 6/1967 | Ashton et al. | 56—21 |

FOREIGN PATENTS 553,223  2/1958  Canada.

ABRAHAM G. STONE, *Primary Examiner.*

P. A. RAZZANO, *Assistant Examiner.*

U.S. Cl. X.R.

74—89.15, 230.17